United States Patent
Toyama et al.

(10) Patent No.: US 10,056,837 B2
(45) Date of Patent: Aug. 21, 2018

(54) DC-DC CONVERTER AND POWER SOURCE DEVICE

(71) Applicant: Kabushiki Kaisha Toshiba, Minato-ku (JP)

(72) Inventors: Yosuke Toyama, Kawasaki (JP); Taichi Ogawa, Inagi (JP); Takeshi Ueno, Kawasaki (JP); Tetsuro Itakura, Nerima (JP); Osamu Watanabe, Chigasaki (JP); Takayuki Miyazaki, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/447,589

(22) Filed: Mar. 2, 2017

(65) Prior Publication Data

US 2018/0006561 A1 Jan. 4, 2018

(30) Foreign Application Priority Data

Jun. 30, 2016 (JP) ................... 2016-130197

(51) Int. Cl.
*G05F 1/577* (2006.01)
*H02M 3/158* (2006.01)

(52) U.S. Cl.
CPC .................. *H02M 3/158* (2013.01)

(58) Field of Classification Search
CPC .................. H02M 2001/009; H02M 2001/008
USPC ................................................ 323/267, 272
See application file for complete search history.

(56) References Cited

U.S. PATENT DOCUMENTS

| | | | | |
|---|---|---|---|---|
| 6,437,545 | B2* | 8/2002 | Sluijs | H02M 3/1584 323/222 |
| 2005/0088160 | A1* | 4/2005 | Tanaka | H02M 3/158 323/284 |
| 2005/0104565 | A1* | 5/2005 | Nagaoka | H02M 3/158 323/222 |
| 2010/0002473 | A1* | 1/2010 | Williams | H02M 3/158 363/21.06 |
| 2011/0043181 | A1* | 2/2011 | Jing | H02M 3/158 323/288 |
| 2012/0286576 | A1* | 11/2012 | Jing | H02M 3/156 307/43 |

(Continued)

FOREIGN PATENT DOCUMENTS

JP   2008-148514   6/2008

*Primary Examiner* — Alex Torres-Rivera
(74) *Attorney, Agent, or Firm* — Oblon, McClelland, Maier & Neustadt, L.L.P.

(57) ABSTRACT

According to one embodiment, a DC-DC converter, includes: an inductor configured to be supplied with an input voltage; a plurality of rectifiers connected in parallel to the inductor; a plurality of p-MOS transistors connected in series to the respective rectifiers; a switch configured to connect an output side of the inductor to a reference potential; and a control circuit configured to control the p-MOS transistors and the switch. The control circuit performs control to supply a voltage to turn on a first p-MOS transistor selected from among the p-MOS transistors to a gate terminal of the first p-MOS transistor, and to supply a voltage depending on an output voltage of the first p-MOS transistor to a gate terminal of a second p-MOS transistor other than the first p-MOS transistor among the p-MOS transistors.

10 Claims, 7 Drawing Sheets

(56) References Cited

U.S. PATENT DOCUMENTS

2012/0326691 A1\* 12/2012 Kuan ................... H02M 3/158
　　　　　　　　　　　　　　　　　　　　323/299

\* cited by examiner

DC-DC CONVERTER AND POWER SOURCE DEVICE

CROSS-REFERENCE TO RELATED APPLICATIONS

This application is based upon and claims the benefit of priority from Japanese Patent Application No. 2016-130197, filed on Jun. 30, 2016; the entire contents of which are incorporated herein by reference.

FIELD

Embodiments described herein relate to a DC-DC converter and a power source device.

BACKGROUND

A multi-output DC-DC converter has been known that includes multiple output systems among which output systems other than one output system are provided with p-MOS switches. The output voltage of the output system provided with no p-MOS switch is the maximum among the output systems of all the output systems. Consequently, the p-MOS switches provided for the other output systems can be turned off using this output voltage.

It is assumed that the output system provided with no p-MOS switch is called an output system 1. If the output voltages of the output systems other than the output system 1 are increased to be at least the output voltage of the output system 1, the output voltage of the output system 1 is also increased accordingly. Furthermore, the output voltage of the output system 1 cannot be reduced to be less than the output voltage of the other output.

To eliminate the limitation among the output voltages, it can be considered that the output system 1 is connected to no external load but is used as an output system dedicated for driving the gates of the p-MOS switches. Unfortunately, in this case, a diode, an output terminal and a capacitor are required only to drive the gates. This requirement increases the circuit area and, in turn, increases the cost.

DETAILED DESCRIPTION

Figure 1:
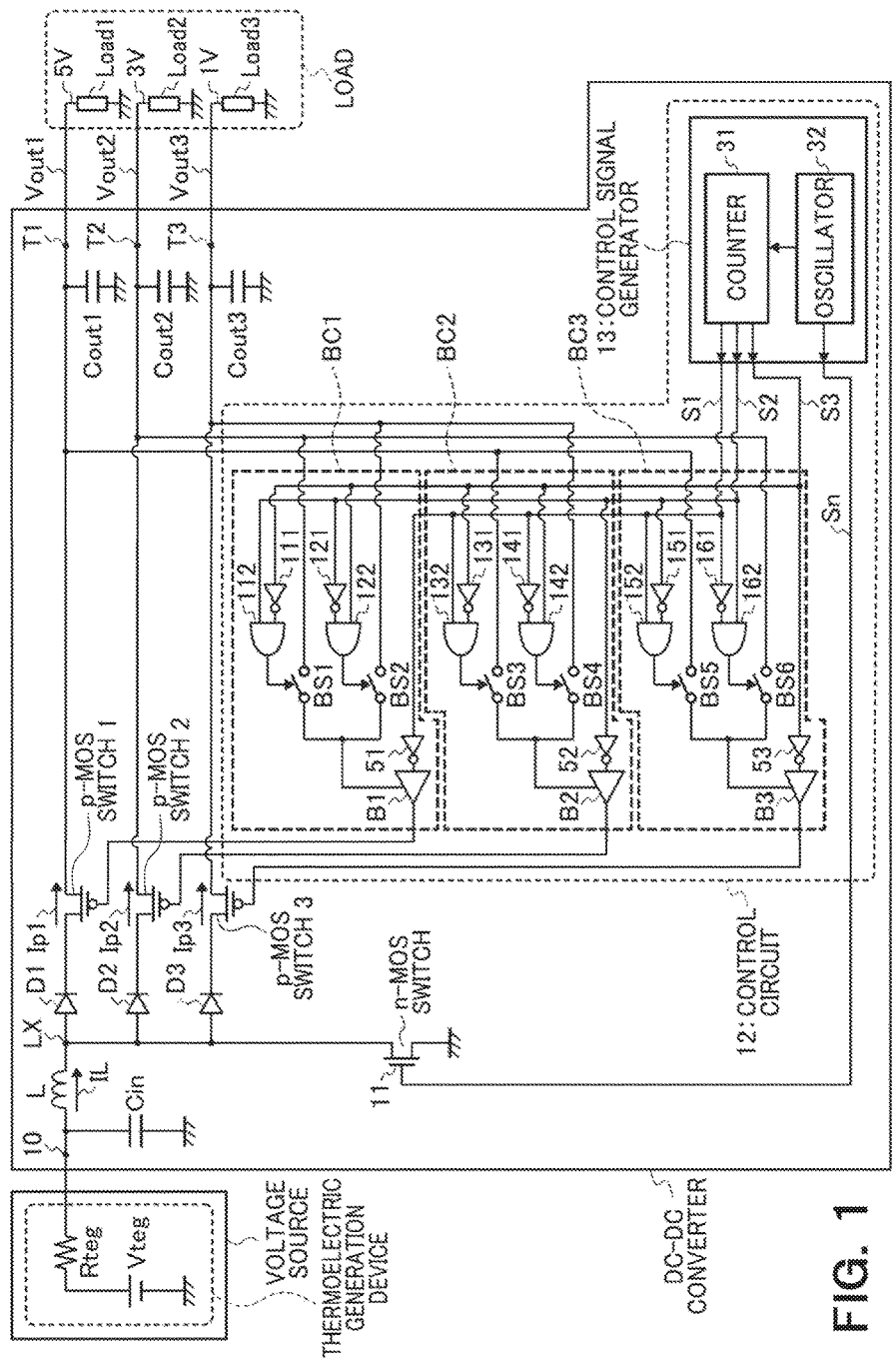
FIG. 1 is a configuration diagram of a circuit provided with a DC-DC converter according to a first embodiment.

According to one embodiment, a DC-DC converter, includes: an inductor configured to be supplied with an input voltage; a plurality of rectifiers connected in parallel to the inductor; a plurality of p-MOS transistors connected in series to the respective rectifiers; a switch configured to connect an output side of the inductor to a reference potential; and a control circuit configured to control the p-MOS transistors and the switch. The control circuit performs control to supply a voltage to turn on a first p-MOS transistor selected from among the p-MOS transistors to a gate terminal of the first p-MOS transistor, and to supply a voltage depending on an output voltage of the first p-MOS transistor to a gate terminal of a second p-MOS transistor other than the first p-MOS transistor among the p-MOS transistors.

Hereinafter, referring to the drawings, embodiments of the present invention are described.

First Embodiment

FIG. 1 illustrates a circuit configuration of a power source device provided with a DC-DC converter according to a first embodiment. The power source device of FIG. 1 includes a direct current (DC) voltage source, and a DC-DC converter that has multiple outputs and converts the voltage of the voltage source into higher voltages. FIG. 1 illustrates a case where the voltage source is a power generator that includes a thermoelectric generation device. The method of power generation of the power generator is not limited to thermal electric power generation. The method may be photovoltaic power generation or another method. The voltage source is not limited to the power generator. Alternatively, the voltage source may be a device that outputs accumulated power, such as a battery.

The thermoelectric generation device can be modeled with an electromotive force Vteg and an output resistance Rteg. Vteg is proportional to the difference in temperatures between a high-temperature component and a low-temperature component that are included in the thermoelectric generation device. For example, for the temperature difference of about several degrees centigrade, Vteg ranges from several tens to several hundreds of millivolts. Rteg has a substantially constant value irrespective of the temperature. For example, this value ranges about several to several hundreds of ohms. A load (electric circuit or the like) connected to the output side of the DC-DC converter typically operates at a power source voltage of at least 1 V. Consequently, the output voltage of the thermoelectric generation device is stepped up by the DC-DC converter.

The DC-DC converter includes an input terminal 10, an input capacitor Cin, an inductor L, an n-MOS switch 11, a diode (rectifier) D1, a diode D2, a diode D3, a p-MOS switch 1, a p-MOS switch 2, a p-MOS switch 3, a control circuit 12, an output capacitor Cout1, and an output capacitor Cout2, an output capacitor Cout3, an output terminal T1, an output terminal T2, and an output terminal T3. The p-MOS switches 1 to 3 are each made up of a p-MOS transistor.

A voltage Vin generated by the thermoelectric generation device is input as an input voltage into the input terminal 10. The input voltage Vin is smoothed by the input capacitor Cin of the DC-DC converter, and is supplied to the inductor L.

The DC-DC converter includes three output systems. The first output system includes a diode D1, a p-MOS switch 1, an output capacitor Cout1, and an output terminal T1. The diode D1 is connected in series to the p-MOS switch 1. The output terminal T1 is connected to a side of the p-MOS switch 1 opposite to that of the diode D1. The output capacitor Cout1 connects the output terminal T1 and a ground potential serving as a reference potential. In this embodiment, connection means electrical connection. The second output system includes a diode D2, a p-MOS switch 2, an output capacitor Cout2, and an output terminal T2. The third output system includes a diode D3, a p-MOS switch 3, an output capacitor Cout3, and an output terminal T3. The configurations of the output systems D2 and D3 are analogous to the configuration of the output system D1.

Three output systems are connected in parallel to the inductor L. More specifically, the diodes D1 to D3 are connected in parallel to the inductor L. In the example of FIG. 1, the number of parallel connections of diodes connected to the inductor L is three. This number may be four or more, or two.

The DC-DC converter converts the input voltage Vin into output voltages Vout1, Vout2 and Vout3 which are higher than the input voltage, and outputs the voltages from the output terminals T1, T2 and T3, respectively. The output terminals T1, T2 and T3 are connected to loads Load1, Load2 and Load3, respectively. The voltages output from the output terminals T1, T2 and T3 are supplied to the loads Load1, Load2 and Load3, respectively. The loads Load1, Load2 and Load3 are circuits that operate on the basis of the supplied voltages. For example, the circuits may be circuits that consume the power, such as LEDs, digital circuits or analog circuits, or devices that accumulate power, such as storage batteries.

The control circuit 12 performs control for opening and closing (turning on and off) the p-MOS switches 1, 2 and 3. The control circuit 12 includes a control signal generator 13, a buffer circuit BC1, a buffer circuit BC2 and a buffer circuit BC3.

The buffer circuit BC1 includes a buffer B1, a buffer switch BS1, and a buffer switch BS2. The buffer circuit BC1 further includes an inverter 51 connected to the input terminal of the buffer B1, a combination of an AND circuit 112 and an inverter 111 that generates a switching signal for the buffer switch BS1, and a combination of an AND circuit 122 and an inverter 121 that generates a switching signal for the buffer switch BS2.

The buffer circuit BC2 includes a buffer B2, a buffer switch BS3, and a buffer switch BS4. The buffer circuit BC2 further includes an inverter 52 connected to the input terminal of the buffer B2, a combination of an AND circuit 132 and an inverter 131 that generates a switching signal for the buffer switch BS3, and a combination of an AND circuit 142 and an inverter 141 that generates a switching signal for the buffer switch BS4.

The buffer circuit BC3 includes a buffer B3, a buffer switch BS5, and a buffer switch BS6. The buffer circuit BC3 further includes an inverter 53 connected to the input terminal of the buffer B3, a combination of an AND circuit 152 and an inverter 151 that generates a switching signal for the buffer switch BS5, and a combination of an AND circuit 162 and an inverter 161 that generates a switching signal for the buffer switch BS6.

The output terminals of the buffer B1, the buffer B2 and the buffer B3 are connected to the respective gate terminals of the p-MOS switch 1, the p-MOS switch 2 and the p-MOS switch 3.

The buffers B1 to B3 output digital signals having voltages supplied to the power source terminals or signals having predetermined voltages, according to input digital signals (high level signals or low level signals) supplied to the input terminals. The predetermined voltage may be 0 V, for example. The output signals are supplied as gate voltages to the gate terminals of the respective p-MOS switches.

The power source terminal of the buffer B1 is connected to the buffer switch BS1 and the buffer switch BS2. The buffer switch BS1 is connected to the output terminal T2. The buffer switch BS2 is connected to the output terminal T3. When the buffer switch BS1 is on-state and the buffer switch BS2 is off-state, a voltage depending on the voltage of the output terminal T2 (i.e., the output voltage of p-MOS switch 2) is supplied to the power source terminal of the buffer B1. When the buffer switch BS1 is off-state and the buffer switch BS2 is on-state, a voltage depending on the voltage of the output terminal T3 is supplied to the power source terminal of the buffer B1.

As with the buffer B1, the power source terminal of the buffer B2 is connected to the buffer switch BS3 and the buffer switch BS4. The buffer switch BS3 is connected to the output terminal T1. The buffer switch BS4 is connected to the output terminal T3. When the buffer switch BS3 is on-state and the buffer switch BS4 is off-state, a voltage depending on the voltage of the output terminal T1 (i.e., the output voltage of p-MOS switch 1) is supplied to the power source terminal of the buffer B2. When the buffer switch BS3 is off-state and the buffer switch BS4 is on-state, a voltage depending on the voltage of the output terminal T3 (i.e., the output voltage of p-MOS switch 3) is supplied to the power source terminal of the buffer B2.

The power source terminal of the buffer B3 is connected to the buffer switch BS5 and the buffer switch BS6. The buffer switch BS5 is connected to the output terminal T1. The buffer switch BS6 is connected to the output terminal T2. When the buffer switch BS5 is on-state and the buffer switch BS6 is off-state, a voltage depending on the voltage of the output terminal T1 (i.e., the output voltage of p-MOS switch 1) is supplied to the power source terminal of the buffer B3. When the buffer switch BS5 is off-state and the buffer switch BS6 is on-state, a voltage depending on the voltage of the output terminal T2 (i.e., the output voltage of p-MOS switch 2) is supplied to the power source terminal of the buffer B3.

In the following description, input of voltages according to the voltages of the output terminals (the output voltages of the p-MOS switches) through the buffer switches into the power source terminals of the buffers B1 to B3 may sometimes be represented that the buffers B1 to B3 are provided with the power source voltages or that the buffers B1 to B3 are driven.

The buffer switches BS1 to BS6 are turned on upon input of a high level signal and turned off upon input of a low level signal. The levels of the signals input into the buffer switches BS1 to BS6 are controlled by the control signal generator 13 and the combinations of the AND circuits and the inverters which correspond to the respective buffer switches BS1, to BS6.

The source terminals of the p-MOS switches 1 to 3 correspond to the output terminals of the p-MOS switches, and are connected to the output terminals T1 to T3 of the DC-DC converters. The drain terminals of the p-MOS switches 1 to 3 correspond to the respective input terminals of the p-MOS switches. The p-MOS switches 1 to 3 are turned on when a voltage lower by at least a threshold value Vth (=0.7 V) than a voltage that is higher one between the voltages of the drain terminal and the source terminal. The forward direction voltages of the diodes with the forward direction current flowing through the diodes D1, D2 and D3 are the same Vf (=0.6 V).

The n-MOS switch 11 is made up of an n-MOS transistor. The drain terminal of the n-MOS switch 11 is connected to the terminal LX, and the source terminal is connected to the ground serving as a reference potential. The gate terminal is connected to an oscillator 32 of the control signal generator 13. The n-MOS switch 11 functions as a short-circuit switch that connects the output side of the inductor to the ground. The n-MOS switch 11 is one example. Alternatively, another type of switch may be adopted. For example, an NPN bipolar transistor may be adopted.

The control signal generator 13 includes a counter 31, and the oscillator 32.

The oscillator 32 repeatedly and periodically outputs the high level voltage and the low level voltage at a predetermined frequency. A signal generated by the oscillator 32 is output to the n-MOS switch 11 and the counter 31. The signal output to the n-MOS switch 11 is represented as a control signal Sn. The signal output to the counter 31 is described as a clock signal.

The counter 31 outputs the control signals S1, S2 and S3 in response to a clock signal input from the oscillator 32. The control signals S1, S2 and S3 are any of three combinations which are (S1, S2, S3)=(High, Low, Low), (Low, High, Low), and (Low, Low, High). "High" represents a high level signal. "Low" represents a low level signal. The control signals S1, S2 and S3, which are outputs of the counter 31, are updated at a rising edge of the clock signal. The update is repeated in an order of (High, Low, Low), (Low, High, Low), and (Low, Low, High).

When the control signal S2 is at the high level and the control signal S3 is at the low level, the high level signal is input into the control terminal of the buffer switch BS1, and this switch is turned on. That is, a signal inverted from the control signal S3 by the inverter 111, and the control signal S2 are input into the AND circuit 112. The output signal of the AND circuit 112 is input as a switching signal into the buffer switch BS1.

When the control signal S2 is at the low level and the control signal S3 is at the high level, the high level signal is input into the control terminal of the buffer switch BS2, and this switch is turned on. That is, a signal inverted from the control signal S2 by the inverter 121, and the control signal S3 are input into the AND circuit 122. The output signal of the AND circuit 122 is input as a switching signal into the buffer switch BS2.

When the control signal S1 is at the high level and the control signal S3 is at the low level, the high level signal is input into the control terminal of the buffer switch BS3, and this switch is turned on. That is, a signal inverted from the control signal S3 by the inverter 131, and the control signal S1 are input into the AND circuit 132. The output signal of the AND circuit 132 is input as a switching signal into the buffer switch BS3.

When the control signal S1 is at the low level and the control signal S3 is at the high level, the high level signal is input into the control terminal of the buffer switch B54, and this switch is turned on. That is, a signal inverted from the control signal S1 by the inverter 141, and the control signal S3 are input into the AND circuit 142. The output signal of the AND circuit 142 is input as a switching signal into the buffer switch BS4.

When the control signal S1 is at the high level and the control signal S2 is the low level, the high level signal is input into the control terminal of the buffer switch BS5, and this switch is turned on. That is, a signal inverted from the control signal S2 by the inverter 151, and the control signal S1 are input into the AND circuit 152. The output signal of the AND circuit 152 is input as a switching signal into the buffer switch BS5.

When the control signal S1 is at the low level and the control signal S2 is at the high level, the high level signal is input into the control terminal of the buffer switch BS6, and this switch is turned on. That is, a signal inverted from the control signal S1 by the inverter 161, and the control signal S2 are input into the AND circuit 162. The output signal of the AND circuit 162 is input as a switching signal into the buffer switch BS6.

A signal inverted from the control signal S1 by the inverter 51 is input into the input terminal of the buffer B1. Thus, when the control signal S1 is at the low level, the high level signal is input into the input terminal of the buffer B1. When the signal of the input terminal of the buffer B1 is at the high level, this buffer outputs a signal according to the voltage supplied to the power source terminal of this buffer to the gate terminal of the p-MOS switch 1.

A signal inverted from the control signal S2 by the inverter 52 is input into the input terminal of the buffer B2. Thus, when the control signal S2 is at the low level, the high level signal is input into the input terminal of the buffer B2. When the signal of the input terminal of the buffer B2 is at the high level, this buffer outputs a signal according to the voltage supplied to the power source terminal of this buffer to the gate terminal of the p-MOS switch 2.

A signal inverted from the control signal S3 by the inverter 53 is input into the input terminal of the buffer B3. Thus, when the control signal S3 is at the low level, the high level signal is input into the input terminal of the buffer B3. When the signal of the input terminal of the buffer B3 is at the high level, this buffer outputs a signal according to the voltage supplied to the power source terminal of this buffer to the gate terminal of the p-MOS switch 3.

Consequently, in a case of (S1, S2, S3)=(High, Low, Low), the buffer switches BS3 and BS5 are turned on and the inputs of the buffers B2 and B3 become the high level. Accordingly, the buffers B2 and B3 are driven, and a voltage depending on the voltage of the output terminal T1 is supplied to the p-MOS switches 2 and 3. The buffer B1 is not driven, a predetermined voltage (0 V) is supplied to the p-MOS switch 1, and the p-MOS switch 1 is turned on. The p-MOS switches 2 and 3 are turned on and off according to the high and low relationship between the output terminals T1 to T3. As described later, in any case, the current from the inductor L is supplied to the output capacitor Cout1. The voltage of the output capacitor Cout1 is output as the output voltage from the output terminal T1.

In a case of (S1, S2, S3)=(Low, High, Low), the buffer switches BS1 and BS6 are turned on and the inputs of the buffers B1 and B3 become the high level. Accordingly, the buffers B1 and B3 are driven, and a voltage depending on the voltage of the output terminal T2 is supplied to the p-MOS switches 1 and 3. The buffer B2 is not driven, the predetermined voltage (0 V) is supplied to the p-MOS switch 2, and the p-MOS switch 2 is turned on. The p-MOS switches 1 and 3 are turned on and off according to the high and low relationship between the output terminals T1 to T3. As described later, in any case, the current from the inductor L is supplied to the output capacitor Cout2. The voltage of the output capacitor Cout2 is output as the output voltage from the output terminal T2.

In a case of (S1, S2, S3)=(Low, Low, High), the buffer switches BS2 and BS4 are turned on and the inputs of the buffers B1 and B2 become the high level. Accordingly, the buffers B1 and B2 are driven, and a voltage depending on the voltage of the output terminal T3 is supplied to the p-MOS switches 1 and 2, The buffer B3 is not driven, the predetermined voltage (0 V) is supplied to the p-MOS switch 3, and the p-MOS switch 3 is turned on. The p-MOS switches 1 and 2 are turned on and off according to the high and low relationship between the output terminals T1 to T3. As described later, in any of the cases, the current from the inductor L is supplied to the output capacitor Cout3. The voltage of the output capacitor Cout3 is output as the output voltage from the output terminal T3.

The output capacitors Cout1, Cout2 and Cout3 are sufficiently large. Consequently, even when current is supplied to the output capacitors Cout1, Cout2 and Cout3, the voltage ripples of output voltages Vout1, Vout2 and Vout3 are small. The variation in output voltage at the time of switching can therefore be regarded as substantially 0 V.

Figure 2:
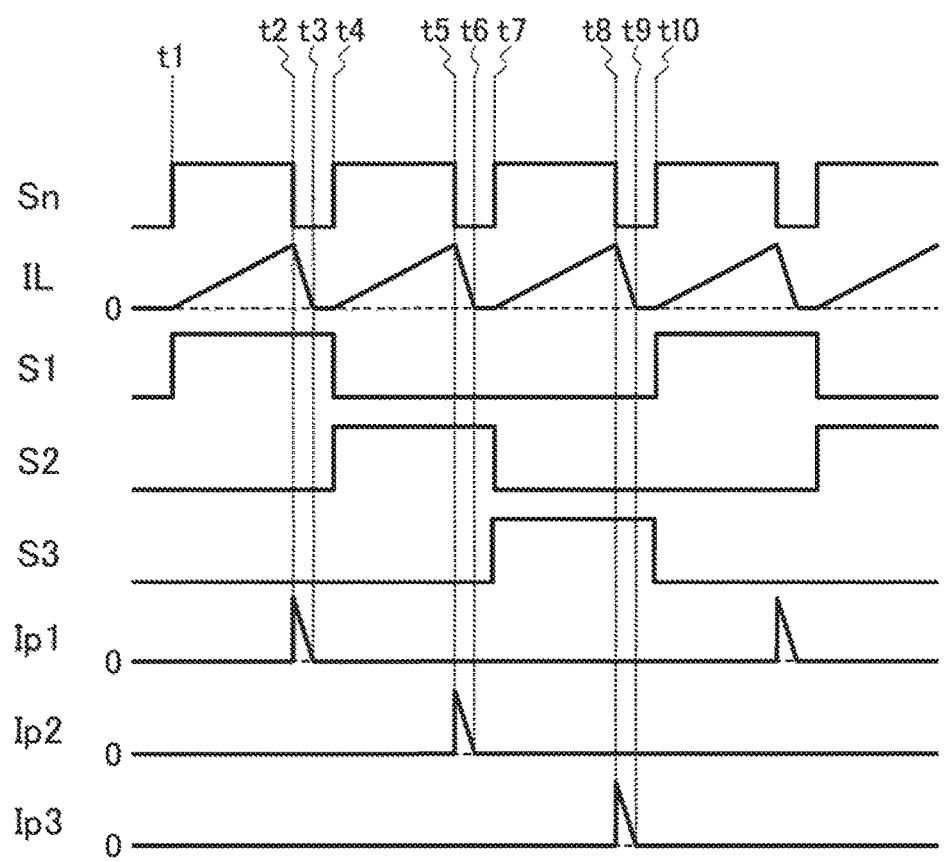
FIG. 2 is a timing chart for illustrating the operation of the circuit of FIG. 1.

Referring to FIG. 2, the operation of the circuit of FIG. 1 is described. FIG. 2 illustrates the wave forms of the control signal Sn, the inductor current IL, the control signals S1, S2 and S3, the current Ip1 of the p-MOS switch 1, the current Ip2 of the p-MOS switch 2, and the current Ip3 of the p-MOS switch 3.

It is assumed that at a certain moment, the output voltage Vout1 is 5 V, the output voltage Vout2 is 3 V, and the output voltage Vout3 is 1 V.

At a time t1, the control signal Sn becomes the high level, signals are updated to be (S1, S2, S3)=(High, Low, Low), and the n-MOS switch 11 is turned on, thereby increasing the inductor current IL. When the control signal Sn becomes the low level at a time t2, the n-MOS switch 11 is turned off and the inductor current IL, which is current accumulated in the inductor, starts to flow toward the output side. The output destination of the inductor current IL is determined by (S1, S2, S3). At this time, (S1, S2, S3)=(High, Low, Low). The states of diodes D1 to D3 and the p-MOS switches 1 to 3 at this time are described.

The low level signal is input into the input terminal of the buffer B1. Both the buffer switches BS1 and BS2 are off. Consequently, no current is supplied to the buffer B1. At this time, the buffer B1 outputs the predetermined, voltage (0 V) having a value of turning on the p-MOS switch 1. Accordingly, the p-MOS switch 1 is turned on. Consequently, the current of the inductor L flows through the diode D1 and the p-MOS switch 1 to the output capacitor Cout1. At this time, the voltage of the terminal LX is a voltage obtained by adding the forward direction voltage Vf of the diode D1 to the voltage 5 V of the output terminal 1. As the voltage of the p-MOS switch 1 is low, this voltage can be ignored.

The high level signal is input into the input terminal of the buffer B2. The buffer switch BS3 is on-state, and the buffer switch BS4 is off-state. Accordingly, the voltage of the output terminal 1 is supplied as a power source to the buffer B2. Consequently, the buffer B2 supplies the voltage 5 V of the output terminal 1 to the gate terminal of the p-MOS switch 2. The voltage of the p-MOS switch 2 on the diode D2 side is 5 V, which is obtained by subtracting the forward direction voltage from the voltage of the terminal LX. That is, as the p-MOS switch 1 is on-state, the voltage obtained by adding the forward direction voltage of the diode D1 to the voltage 5 V of the output terminal T1 is the voltage of the terminal LX. The voltage of the p-MOS switch 2 on the output terminal side is 3 V. Consequently, the p-MOS switch 2 is turned off, and no current is supplied to the output capacitor Cout2.

The high level signal is input into the input terminal of the buffer B3. The buffer switch BS5 is on-state, and the buffer switch BS6 is off-state. Accordingly, the voltage of the output terminal 1 is supplied as a power source to the buffer B3.

Consequently, the buffer 63 supplies the voltage 5 V of the output terminal 1 to the gate terminal of the p-MOS switch 3. The voltage of the p-MOS switch 3 on the diode D3 side is 5 V, which is obtained by subtracting the forward direction voltage from the voltage of the terminal LX. That is, as the p-MOS switch 1 is on-state, the voltage obtained by adding the forward direction voltage of the diode D1 to the voltage 5 V of the output terminal T1 is the voltage of the terminal LX. The voltage of the p-MOS switch 3 on the output terminal 1 side is 1 V. Consequently, the p-MOS switch 3 is turned off, and no current is supplied to the output capacitor Cout3.

Consequently, the inductor current is supplied only to the output capacitor Cout1. That is, the control circuit 12 performs control to select the p-MOS switch 1, supply a voltage for turning on the p-MOS switch 1 to the gate terminal of the selected p-MOS switch 1, and supply a voltage depending on the output of the p-MOS switch 1 to the gate terminals of the p-MOS switches 2 and 3, which are other than the p-MOS switch 1. As a result, the p-MOS switch 1 is turned on and the p-MOS transistors 2 and 3 are turned off, and the inductor current is supplied only to the output capacitor Cout1. The inductor current gradually decreases. When the current becomes 0 [A] at the time t3, the current is prevented from flowing owing to the rectifying action of the diode D1. The selected p-MOS switch (here, the p-MOS switch 1) corresponds to the first p-MOS transistor. The other p-MOS switches (here, the p-MOS switches 2 and 3) correspond to the second p-MOS transistor.

Next, the control signal Sn becomes the high level at the time t4, signals are updated to be (S1, S2, S3)=(Low, High, Low). Consequently, the n-MOS switch 11 is turned on, and the inductor current increases. When the control signal Sn is switched to the low level at the time t5, the n-MOS switch 11 is turned off and the inductor current starts to flow toward the output side. At this time, (S1, S2, S3)=(Low, High, Low). The states of the diodes D1 to D3 and the p-MOS switches 1 to 3 at this time are described.

The low level signal is input into the input terminal of the buffer B2. Both the buffer switches BS3 and BS4 are off. Consequently, no current is supplied to the power source terminal of the buffer B2. At this time, the buffer B2 outputs the predetermined voltage (0 V) for turning on the p-MOS switch 2, and the p-MOS switch 2 is turned on.

The high level signal is input into the input terminal of the buffer B3. The buffer switch BS5 is off-state, and the buffer switch BS6 is on-state. Accordingly, the voltage of the output terminal 2 is supplied to the power source terminal of the buffer B3. Consequently, the buffer B3 supplies the voltage 3 V of the output terminal 2 to the gate terminal of the p-MOS switch 3. The voltage of the p-MOS switch 3 on the diode D3 side is 3 V, which is obtained by subtracting the forward direction voltage from the voltage of the terminal LX (as described later, the current of the inductor L flows through the diode D2 and the p-MOS switch 2 to the output capacitor Cout2). The terminal of the p-MOS switch 3 on the output terminal T3 side is 1 V. Consequently, the p-MOS switch 3 is turned off, and no current flows to the output capacitor Cout3.

The high level signal is input into the input terminal of the buffer B1. The buffer switch BS1 is on-state, and the buffer switch BS2 is off-state. Accordingly, the voltage of the output terminal 2 is supplied to the power source terminal of the buffer B1. Consequently, the buffer B1 supplies the voltage 3 V of the output terminal 2 to the gate terminal of the p-MOS switch 1. The voltage of the p-MOS switch 1 on the output terminal side is 5 V. In the p-MOS switch 1, the gate voltage 3 V is lower than the voltage 5 V at the terminal on the output terminal T1 side by at least the threshold value of 0.7 V. Accordingly, the p-MOS switch 1 is turned on. Consequently, in addition to the aforementioned p-MOS switch 2, the p-MOS switch 1 is turned on. The actions of the diode D1 and the diode D2 allow the inductor current to be supplied to a lower voltage between the voltages of the output terminal T1 and the output terminal T2. In this case, the voltage 3 V of the output terminal T2 is lower than the voltage 5 V of the output terminal T1. Consequently, current is supplied to the output capacitor Cout2, and no current is supplied to the output capacitor Cout1. The inductor current gradually decreases. When the current becomes 0 [A] at the time t6, current is prevented from flowing owing to the rectifying action of the diode D2.

Next, at the time t7, the control signal Sn becomes the high level and the signals are updated to be (S1, S2, S3)=(Low, Low, High). Consequently, the n-MOS switch 11 is turned on, and the inductor current increases. When the control signal Sn is switched to the low level at the time t8, the n-MOS switch 11 is turned off and the inductor current starts to flow toward the output side. At this time, (S1, S2, S3)=(Low, Low, High). The states of the diodes D1 to D3 and the p-MOS switches 1 to 3 are described.

The low level signal is input into the input terminal of the buffer B3. Both the buffer switches BS5 and BS6 are off. Consequently, the power source is not supplied to the power source terminal of the buffer B3. At this time, the buffer B3 outputs the predetermined voltage (0 V) for turning on the p-MOS switch 3. Consequently, the p-MOS switch 3 is turned on.

The high level signal is input into the input terminal of the buffer B1. The buffer switch BS1 is off-state, and the buffer switch BS2 is on-state. Accordingly, the voltage of the output terminal 3 is supplied to the power source terminal of the buffer B1. Consequently, the buffer B1 supplies the voltage 1 V of the output terminal T3 to the gate terminal of the p-MOS switch 1. The voltage of the p-MOS switch 1 on the output terminal 1 side is 5 V. In the p-MOS switch 1, the gate voltage 1 V is lower than the voltage 5 V of the terminal on the output terminal 1 side by at least the threshold value 0.7 V. Consequently, the p-MOS switch 1 is turned on.

The high level signal is input into the input terminal of the buffer B2. The buffer switch BS3 is off-state, and the buffer switch BS4 is on-state. Accordingly, the voltage of the output terminal 3 is supplied to the power source terminal of the buffer B2. Consequently, the buffer B2 supplies the voltage 1 V of the output terminal 3 to the gate terminal of the p-MOS switch 2. The voltage of the p-MOS switch 2 on the output terminal T2 side is 3 V. In the p-MOS switch 2, the gate voltage 1 V is lower than the voltage 3 V on the output terminal T2 side by at least the threshold value 0.7. Accordingly, the p-MOS switch 2 is turned on. Consequently, in addition to the aforementioned p-MOS switches 3 and 1, the p-MOS switch 2 is also turned on. Actions of the diodes D1, D2 and D3 allow the inductor current to be supplied toward the terminal having the lowest voltage among the output terminal T1, output terminal T2 and output terminal T3. In this case, the voltage 1 V of the output terminal 3 is the lowest. Consequently, the inductor current is supplied only to the output capacitor Cout3. The inductor current gradually decreases. When the current becomes 0 [A] at the time t9, the rectifying action of the diode D3 prevents the current from flowing.

Next, when the control signal Sn becomes the high level at the time t10, the signals becomes to be (S1, S2, S3)= (High, Low, Low) again, and the analogous operation is repeated.

As described above, when a certain output system is selected and current is caused to flow into the selected output system, the output voltage of the selected output system is supplied to the gate terminals of the p-MOS switches arranged in the other output systems. Thus, the p-MOS switches arranged in the output systems having output voltages equal to or less than the output voltage of the selected output system are turned off. Although the p-MOS switch arranged in the output system having a higher voltage than the selected output system does is not turned off in some cases, the selected output system has a lower output voltage. As a result, current is supplied only to the selected output system.

As described above, irrespective of the high and low relationship of the output voltages, the current can be supplied only to the selected output system. Even when the value of the output voltage Vout2 is changed to be 6 V exceeding the output voltage Vout1 and thus the high and low relationship between output voltages is changed, the destination of current supply can be freely selected according to the control signals (S1, S2, S3), As with DVS (Dynamic Voltage Scaling), even a circuit having a varying power source voltage can be driven, which is applicable to a load of a boost converter.

Figure 3:
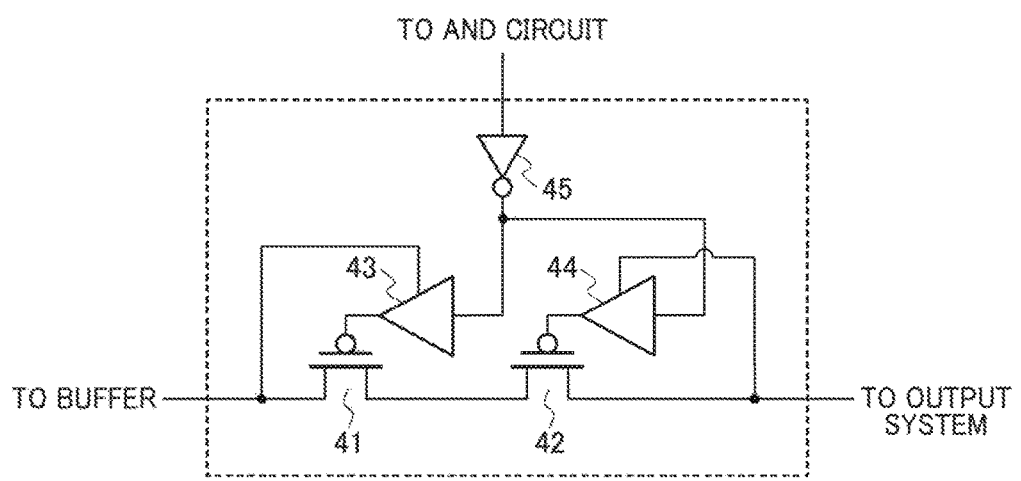
FIG. 3 is a configuration diagram of a switch for a buffer according to the first embodiment.

FIG. 3 illustrates an example of a circuit configuration of the buffer switches BS1 to BS6. Each of the buffer switches BS1 to BS6 includes a p-type MOSFET 41, a p-type MOSFET 42, a buffer 43, a buffer 44, and an inverter 45.

The p-type MOSFET 41 and the p-type MOSFET 42 are connected in series to each other. The gate terminals of the p-type MOSFET 41 and the p-type MOSFET 42 are connected to the output terminals of the buffers 43 and 44, respectively. The source terminal of the p-type MOSFET 41 is connected to the output of the buffer switch (buffer B1, B2 or B3 side). The drain terminal of the p-type MOSFET 42 is connected to the input (output system side) of the buffer switch. Both the inputs of the buffers 43 and 44 are connected to the output of the inverter 45. The input of the inverter 45 is connected to the output of the AND circuit in FIG. 1. The input of the inverter 45 corresponds to the control terminal of the buffer switch. The switching signal (the output signal of the AND circuit) is input thereinto.

When the switching signal is the high level signal, the output of inverter 45 becomes the low level and both the outputs of the buffers 43 and 44 become 0 V. Consequently, both the p-type MOSFET 41 and, p-type MOSFET 42 are turned on, and the buffer switch is turned on. When the switching signal is at the low level, the output of the inverter 45 is at the high level, and the voltage of the buffer switch on the output side (buffer B1, B2 or B3 side) is input into the gate terminal of the p-type MOSFET 41 and the voltage on the input side (output system side) is input into the gate terminal of the p-type MOSFET 42.

Consequently, when the output terminal of the buffer switch has a higher voltage than the input terminal has, the p-type MOSFET 41 is turned off. When the input terminal has a higher voltage than the output terminal has, the p-type MOSFET 42 is turned off. As the p-type MOSFETs 41 and 42 are connected in series to each other, the buffer switch is turned off when the switching signal of the buffer switch is high.

As described above, according to this embodiment, the output system serving as the current output destination can be selected irrespective of the high and low relationship between the output voltages of the output systems. Consequently, the necessity of the output terminal dedicated for driving the gates of the p-MOS switches in the related technique is negated, which exerts an advantageous effect of reducing the areas and costs of the accompanying wiring, smoothing capacitor and the like. The counter is adopted as the control signal generator 13. Consequently, the control signal can be simply generated.

Second Embodiment

Figure 4:
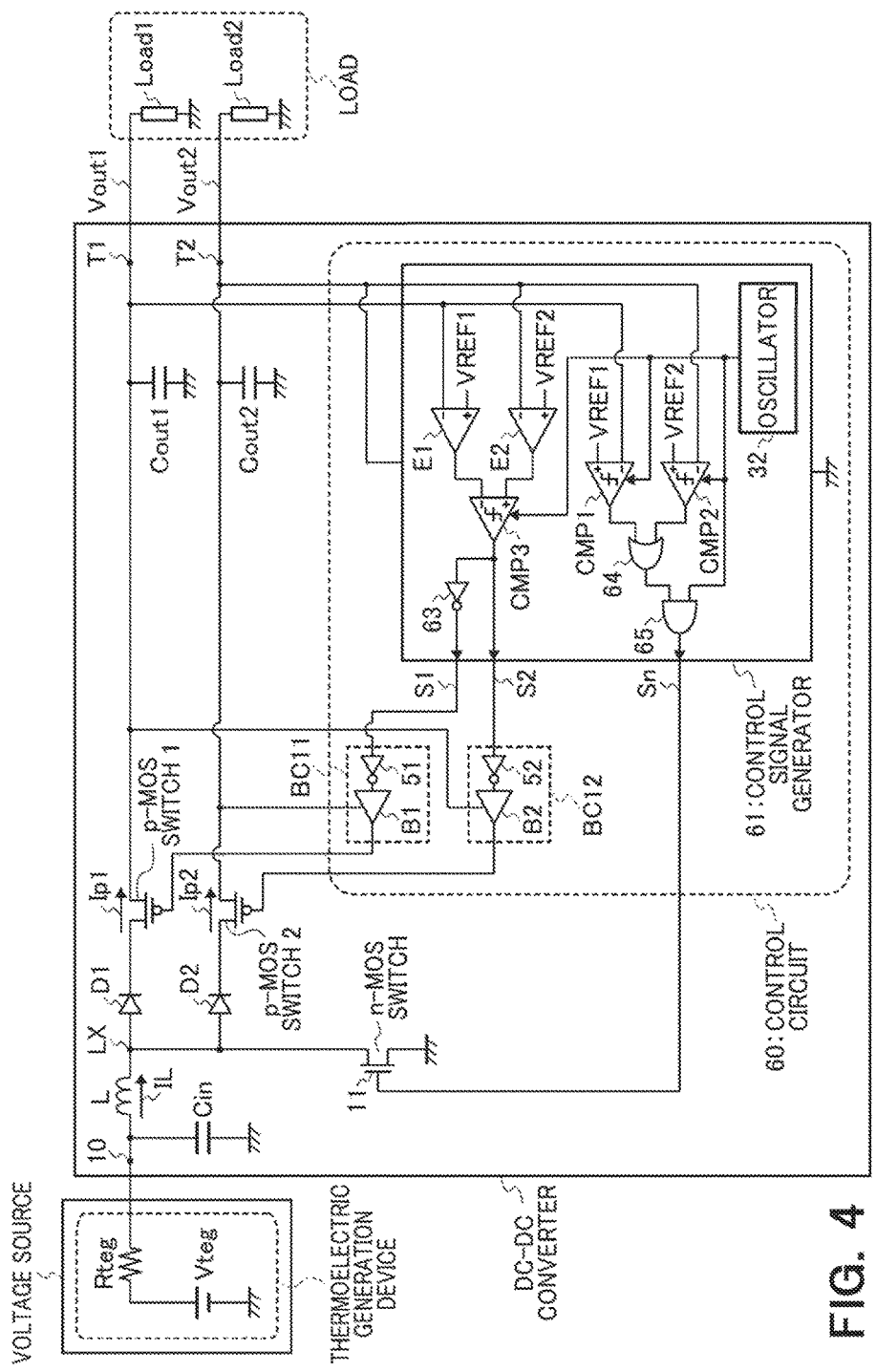
FIG. 4 is a configuration diagram of a circuit provided with a DC-DC converter according to a second embodiment.

FIG. 4 illustrates the circuit configuration of a power source device that includes a DC-DC converter according to a second embodiment. The description redundant with that of the first embodiment is omitted. The description is made mainly on the difference therebetween.

In the first embodiment, the number of output systems is three. In this embodiment, this number is two. Accordingly, the number of loads connected to the DC-DC converter is two. The buffer switches BS1 to BS6 and the buffer circuit BC3 in the first embodiment are eliminated, and the configuration of a control signal generator 61 of a control circuit 60 is changed.

The power source terminal of the buffer B1 is connected to the output terminal T2 (the output terminal of the p-MOS switch 2). The power source terminal of the buffer B2 is connected to the output terminal T1 (the output terminal of the p-MOS switch 1).

The control signal generator 61 generates and outputs the control signals S1, S2 and Sn. The control signal Sn is supplied to the gate terminal of the n-MOS switch 11. The control signal S1 is supplied to the buffer circuit BC11, more specifically, the inverter 51 of the buffer circuit BC11. The control signal S2 is supplied to the buffer circuit BC12, more specifically, the inverter 52 of the buffer circuit BC12.

The control signal generator 61 includes an error detector E1 and an error detector E2, a comparator CMP1, a comparator CMP2, a comparator CMP3, an inverter 63, an OR circuit 64, an AND circuit 65, and an oscillator 32. The oscillator 32 is analogous to that of the first embodiment.

The output voltage Vout1 of the output terminal T1 and the reference voltage VREF1 are input into the error detector E1. The difference therebetween, that is, a value (first difference) obtained by subtracting Vout1 from VREF1, is output. The output voltage Vout2 of the output terminal T2 and the reference voltage VREF2 are input into the error detector E2. The difference therebetween, that is, a signal representing a value (second difference) obtained by subtracting Vout2 from VREF2, is output.

In a case where the second difference is larger than the first difference, the comparator CMP3 outputs the high level signal. In the other cases, this comparator outputs the low level signal. Thus, current can be supplied with precedence to the output system having a higher one of the outputs of the error detector E1 and the error detector E2, that is, the output system having an output voltage further apart from the reference voltage. The output signal of the oscillator 32 is input into the comparator CMP3, and this oscillator operates at the rising of the output signal of the oscillator 32.

The output signal of the comparator CMP3 is the control signal S2. A signal inverted by the inverter 63 from the output signal of the comparator CMP3 is the control signal S1.

When the control signal S2 is the high level signal, this signal is inverted by the inverter 52 of the buffer circuit BC12, and the low level signal is input into the buffer B2. Consequently, the predetermined voltage (0 V) is output from the buffer B2, and the p-MOS switch 2 is turned on. When the control signal S2 is the low level signal, this signal is inverted by the inverter 52 of the buffer circuit BC12, and the high level signal is input into the buffer B2. Consequently, a voltage depending on the voltage of the output terminal T1 (the output voltage of the p-MOS switch 1) is supplied from the buffer B2 to the gate terminal of the p-MOS switch 2.

When the control signal S1 is the high level signal, this signal is inverted by the inverter 51 of the buffer circuit BC11, and the low level signal is input into the buffer B1. Consequently, the predetermined voltage (0 V) is output from the buffer B1, and the p-MOS switch 1 is turned on. When the control signal S1 is the low level signal, this signal is inverted by the inverter 51 of the buffer circuit BC11, and the high level signal is input into the buffer B1. Consequently, a voltage depending on the voltage of the output terminal T2 (the output voltage of the p-MOS switch 2) is supplied from the buffer B1 to the gate terminal of the p-MOS switch 1.

Each of the control signals S1 and S2 is any of two cases, or (S1, S2)=(High, Low) and (Low, High). In the case of (S1, S2)=(High, Low), the current is supplied to the output capacitor Cout1. In the case of (S1, S2)=(Low, High), the current is supplied to the output capacitor Cout2.

When the output voltage Vout1 is at least the reference voltage VREF1 and the output voltage Vout2 is at least the reference voltage VREF2, the control signal Sn is at the low level and the n-MOS switch 11 is turned off. Consequently, current input from the thermoelectric generation device into the inductor is stopped, which can reduce the power consumption.

More specifically, the comparator CMP1 compares the reference voltage VREF1 with the output voltage Vout1. In a case where the reference voltage VREF1 is higher, this comparator outputs the high level signal. In the other cases, this comparator outputs the low level signal. The comparator CMP2 compares the reference voltage VREF2 with the output voltage Vout2. In a case where the reference voltage VREF2 is higher, this comparator outputs the high level signal. In the other cases, this comparator outputs the low level signal. The output signal of the oscillator 32 is input into the comparators CMP1 and CMP2. The comparators operate at the rising of the output signal of the oscillator 32.

When at least one of the output signals of the comparators CMP1 and CMP2 is at the high level, the OR circuit 64 outputs the high level signal. When both the output signals are at the low level, the OR circuit 64 outputs the low level signal. When both the output signal of the OR circuit 64 and the output signal of the oscillator 32 are at the high level, the AND circuit 65 outputs the high level signal. When at least one of the output signals is at the low level, this AND circuit outputs the low level signal. Consequently, when the output voltage Vout1 becomes at least the reference voltage VREF1 and the output voltage Vout2 becomes at least the reference voltage VREF2, the output signal of the AND circuit 65 (control signal Sn) becomes the low level and the n-MOS switch 11 is turned off.

In this embodiment, the control signal generator 61 is used as the load (Load2), and the power source terminal of the control signal generator 61 is connected to the output terminal T2. That is, the voltage of the output terminal T2 is used as the power source of the control signal generator.

Figure 5:
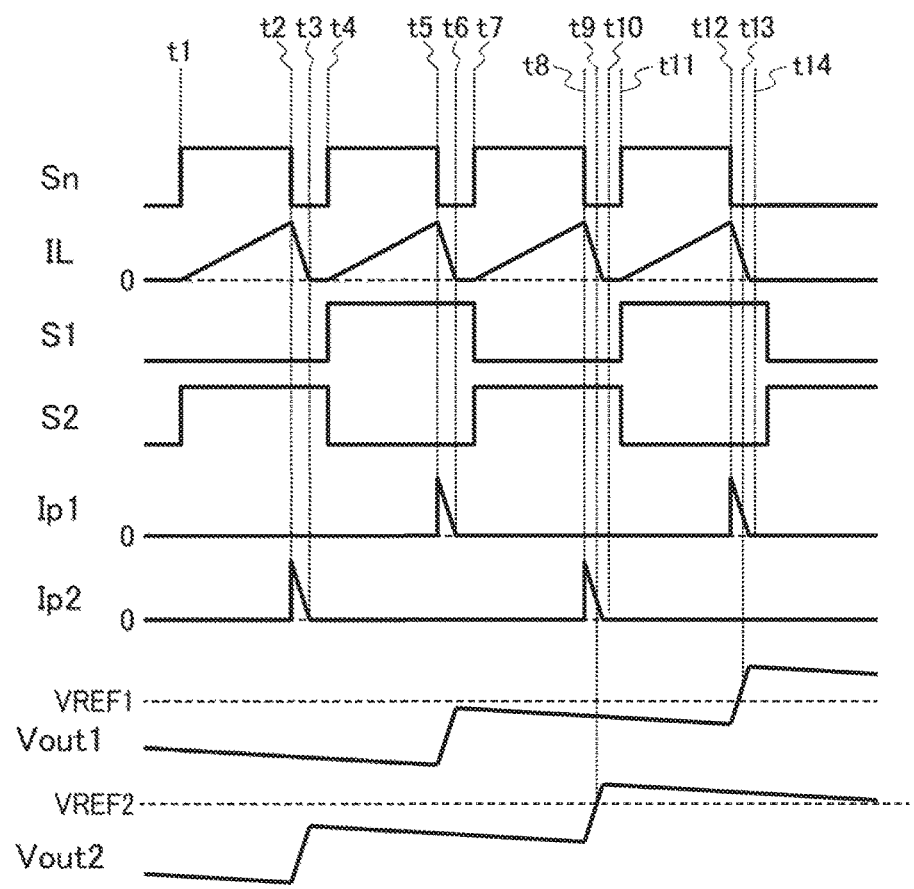
FIG. 5 is a timing chart for illustrating the operation of the circuit of FIG. 4.

Referring to FIG. 5, the operation of the circuit in FIG. 4 is described. FIG. 5 illustrates the control signal Sn, the inductor current IL, the control signals S1 and S2, the current Ip1 of the p-MOS switch 1, the current Ip2 of the p-MOS switch 2, the output voltages Vout1 and Vout2, and the reference voltages VREF1 and VREF2. Setting of VREF1>VREF2 performs control to achieve Vout1 having a higher value than Vout2 does.

At the same time of the rising of the output signal of the oscillator 32 at the time t1, the control signal Sn becomes the high level; the n-MOS switch 11 is turned on, and the inductor current IL starts to increase. At this time, the error detector E1 outputs a value obtained by subtracting Vout1 from VREF1. The error detector E2 outputs a value obtained by subtracting Vout2 from VREF2. High and low comparison between these values by the comparator CMP3 indicates that the value obtained by subtracting Vout2 from VREF2 is higher. As a result, (S1, S2)=(Low, High). At the time t2, the control signal Sn falls, and the n-MOS switch 11 is turned off. The inductor current IL continues flowing toward the output side.

The high level signal is input into the buffer B1, and the buffer B1 is driven by the output voltage Vout2. Consequently, the voltage of Vout2 is supplied to the gate terminal of the p-MOS switch 1. As the low level signal is input into the buffer B2, the predetermined voltage (0 V) is supplied to the gate terminal of the p-MOS switch 2. Consequently, the p-MOS switch 2 is turned on. As Vout1>Vout2, the actions of the diodes D1 and D2 cause the current supply destination to be the output capacitor Cout2 when the p-MOS switch 2 is on-state. There may be a case where the p-MOS switch 1 is turned off or turned on according to the magnitude of Vout1. Even when the p-MOS switch 1 is turned on, Vout2 is lower than Vout1. Consequently, no current flows into the output capacitor Cout1. The current flow into the output capacitor Cout2 increases the output voltage Vout2. The inductor current IL, and the current Ip2 of the p-MOS switch 2 decrease, and reach 0 [A] at the time t3.

At the time t4, the control signal Sn becomes the high level. At this time, the value obtained by subtracting Vout1 from VREF1 is larger than the value obtained by subtracting Vout2 from VREF2. Consequently, (S1, S2)=(High, Low). At the time t5, the control signal Sn falls, and the n-MOS switch 11 is turned off. The inductor current IL continues flowing in the output direction.

The low level signal is input into the buffer B1. Accordingly, the predetermined voltage (0 V) is supplied to the gate terminal of the p-MOS switch 1. Consequently, the p-MOS switch 1 is turned on. The high level signal is input into the buffer B2, and this buffer is driven by the output voltage Vout1. Consequently, the output voltage Vout1 is supplied to the gate terminal of the p-MOS switch 2. As Vout1>Vout2, the p-MOS switch 2 is turned off. Consequently, the current supply destination is the output capacitor Cout1. The current flow to the output capacitor Cout1 increases the output voltage Vout1. The inductor current IL and the current Ip1 of the p-MOS switch decrease, and reach 0 [A] at the time t6.

At the time t7, the control signal Sn becomes the high level. At this time, the value obtained by subtracting Vout2 from VREF2 is larger than the value obtained by subtracting Vout1 from VREF1. Consequently, (S1, S2)=(Low, High). At the time t8, the control signal Sn falls, and the n-MOS switch 11 is turned off. At this time, as with the case at the times t2 to t4, the current supply destination is the output capacitor Cout2. Consequently, the output voltage Vout2 increases, and exceeds VREF2 at the time t9. The inductor current IL and current Ip2 decrease, and reach 0 [A] at the time t10.

At the time t11, the control signal Sn becomes the high level. At this time, the value obtained by subtracting Vout1 from VREF1 is larger than the value obtained by subtracting Vout2 from VREF2. Consequently, (S1, S2)=(High, Low). At the time t12, the control signal Sn falls, and the n-MOS switch 11 is turned off. At this time, as with the cases at the times t5 to t7, the current supply destination is the output capacitor Cout1. Consequently, the output voltage Vout1 increases, and exceeds VREF1 at the time t13, and the inductor current IL and current Ip1 decrease, and reaches 0 [A] at the time t14.

After this point, both the outputs of the comparators CMP1 and CMP2 are at the low level until the voltages become again such that Vout1<VREF1 or Vout2<VREF2. Consequently, the control signal Sn is left to be at the low level.

In the second embodiment, the output voltage of each output system is compared with the reference voltage. The current is supplied to the output system having the largest difference to recover the voltage, thereby reducing errors of the output voltage. Consequently, the voltage can be recovered quickly even if the load is fluctuated. Furthermore, the number of output systems is two, which negates the need of the buffer switch for selecting the buffer driving voltage. Consequently, the circuit is simplified. The output voltage (Vout2 in this embodiment) used as the power source of the control signal generator is controlled at the lower voltage than the other output voltage (Vout1). Consequently, the power consumption can be reduced. That is, the power source voltage of the control signal generator is set to be the voltage as low as possible, which reduces the power consumption.

Third Embodiment

Figure 6:
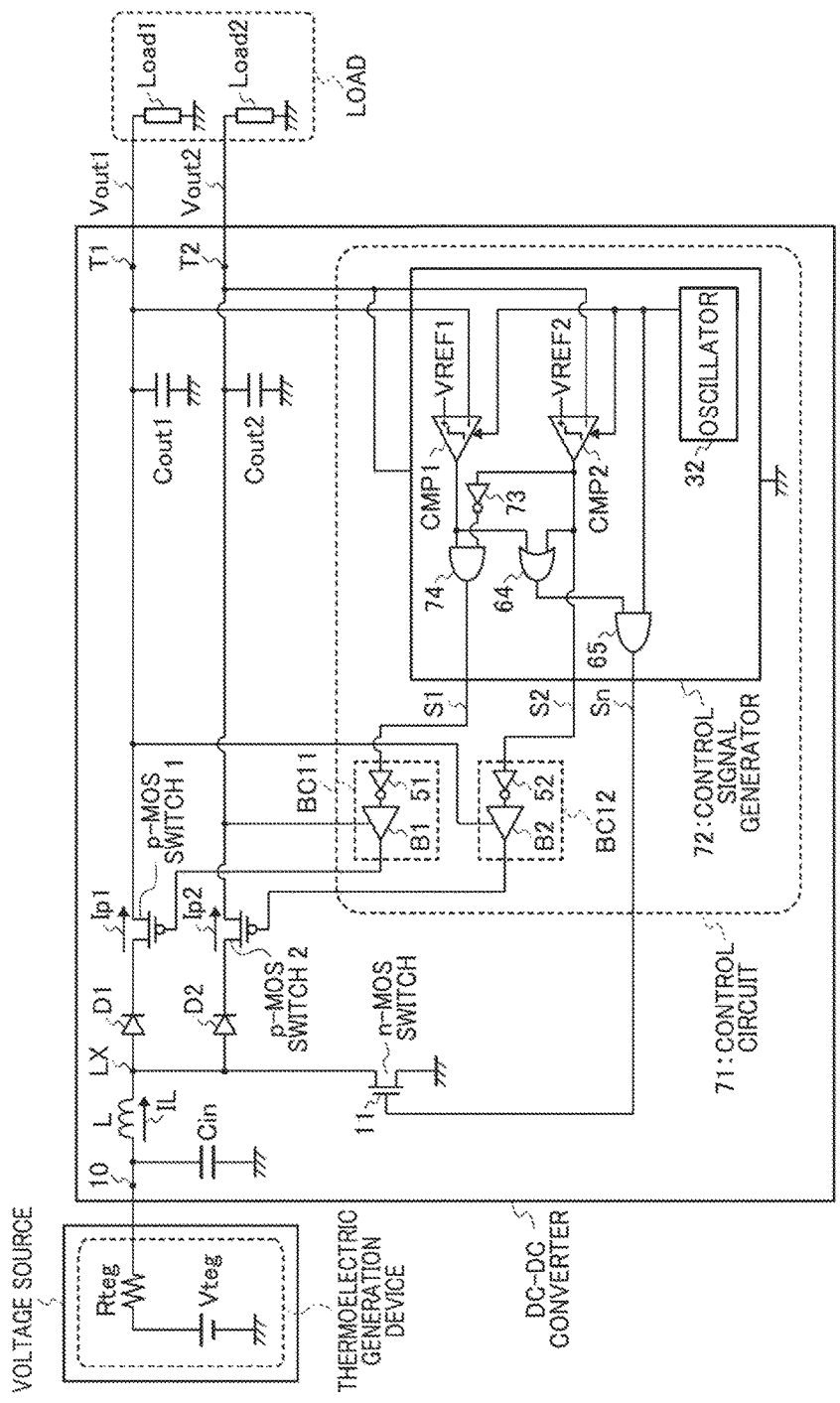
FIG. 6 is a configuration diagram of a circuit provided with a DC-DC converter according to a third embodiment.

FIG. 6 illustrates a circuit configuration of a power source device that includes a DC-DC converter according to a third embodiment. Hereinafter, the description redundant with that of the second embodiment is omitted, and the description is made mainly on the difference thereof.

In this embodiment, the output voltage Vout2 is controlled with precedence over the output voltage Vout1. More specifically, when the output voltage Vout2 is less than the reference voltage VREF2, the current is allowed to flow to the output capacitor Cout2. When the output voltage Vout2 becomes at least reference voltage VREF2, the current is allowed to flow to the output capacitor Cout1. Hereinafter, this embodiment is described in detail.

Also in this embodiment, the number of output systems is two, and the number of loads connected to the DC-DC converter is also two. A control signal generator 72 is used as a load (Load2). The voltage Vout2 of the output terminal 2 is used as the drive power source of the control signal generator 72.

The oscillator 32 is the same as the oscillator 32 of the second embodiment. The comparators CMP1 and CMP2 are the same as the comparators CMP1 and CMP2 of the second embodiment. The AND circuits 65 and the OR circuit 64 are the same as the AND circuits 65 and the OR circuit 64 of the second embodiment. Consequently, when Vout1 becomes at least VREF1 and Vout2 becomes at least VREF2, the control signal Sn becomes the low level and the n-MOS switch 11 is turned off.

An inverter 73 inverts the output signal of the comparator CMP2. The AND circuit 74 outputs the high level signal when both the output signal of the inverter 73 and the output signal, of the comparator CMP1 are at the high level. This circuit outputs the low level signal when at least one thereof is at the low level. The output signal of the AND circuit 74 is the control signal S1, and is input into the buffer circuit BC11; more specifically, the signal is input into the inverter 51 of the buffer circuit BC11. That is, when the output voltage Vout2 is less than the reference voltage VREF2, the AND circuit 74 always outputs the control signal S1 that is at the low level. Only when the output voltage Vout2 is at least the reference voltage VREF2 and the output voltage Vout1 is less than the reference voltage VREF1, the AND circuit 74 outputs the control signal S1 at the high level, thereby turning on the p-MOS switch 1.

The output signal of the comparator CMP2 is the control signal S2, and is input into the buffer circuit BC12; more specifically, the signal input into the inverter 52 of the buffer circuit BC12. That is, when the output voltage Vout2 is less than the reference voltage VREF2, the control signal S2 that is at the high level is always output, thereby turning on the p-MOS switch 2.

Each of the control signals S1 and S2 is any of three cases, or (S1, S2)=(High, Low), (Low, High) and (Low, Low). In the case of (S1, S2)=(High, Low), the current is supplied to the output capacitor Cout1. In the case of (S1, S2)=(Low, High), the current is supplied to the output capacitor Cout2. In the case of (S1, S2)=(Low, Low), no current is supplied to any of the output capacitors Cout1 and Cout2.

According to the above configuration, when the output voltage Vout2 is less than the reference voltage VREF2, the current is allowed to flow to the output capacitor Cout2; when the output voltage Vout2 is at least the reference voltage VREF2, the current is allowed to flow to the output capacitor Cout1.

Figure 7:
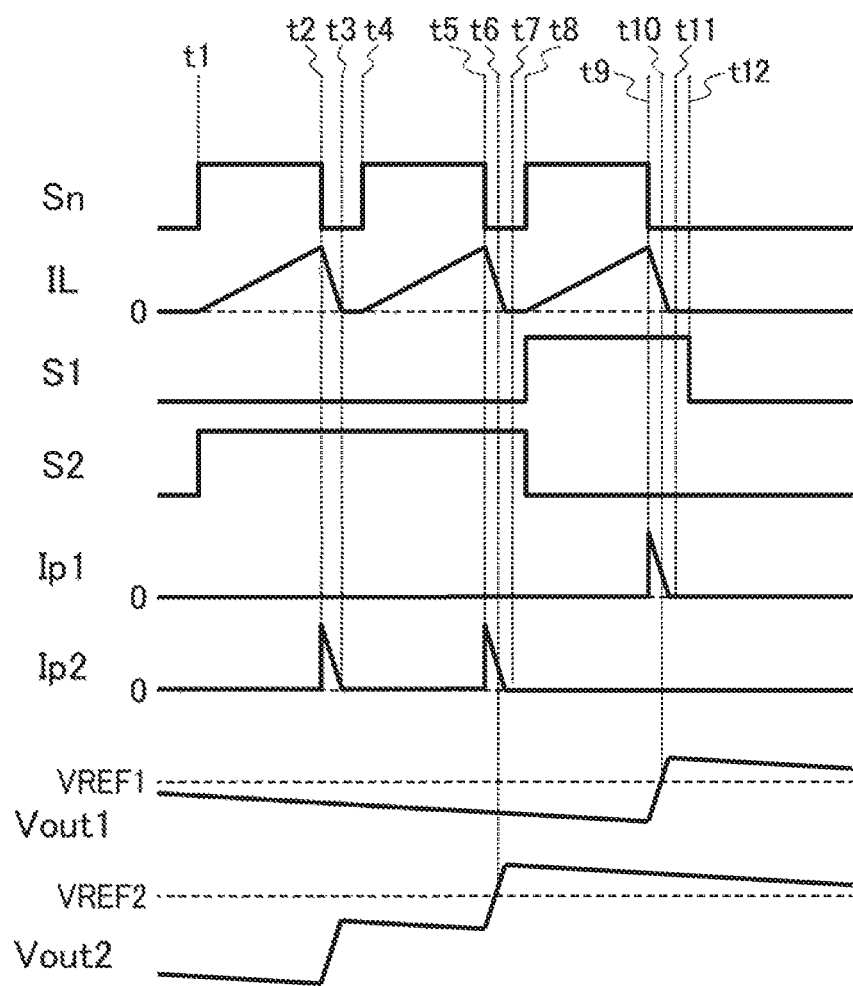
FIG. 7 is a timing chart for illustrating the operation of the circuit of FIG. 6.

Referring to FIG. 7, the operation of the circuit in the FIG. 6 is described. FIG. 7 illustrates the control signal Sn, the inductor current IL, the control signals S1 and S2, the current Ip1 of the p-MOS switch 1, the current Ip2 of the p-MOS switch 2, the output voltages Vout1 and Vout2, and the reference voltages VREF1 and VREF2. Furthermore, it is set such that VREF1>VREF2, and Vout1 is controlled to have a higher value than Vout2 does. it is satisfied that VREF1>Vf, VREF2>Vf, VREF1>Vth, and VREF2>Vth.

At the time t1, the output signal of the oscillator 32 rises and, at the same time, the control signal Sn becomes the high level. The n-MOS switch 11 is turned on, and the inductor current IL starts to increase. At this time, both the comparators CMP1 and CMP2 output the high level signals (because both Vout1 and Vout2 are less than VERF1 and VERF2). As a result, (S1, S2)=(Low, High).

At the time t2, the control signal Sn falls, and the n-MOS switch 11 are turned off. The inductor current IL continues flowing toward the output side.

The high level signal is input into the buffer B1, which is driven by the output voltage Vout2. Consequently, the output voltage Vout2 is supplied to the p-MOS switch 1. The low level signal is input into the buffer B2. The predetermined voltage (0 V) is supplied to the gate of the p-MOS switch 2. Consequently, the p-MOS switch 2 is turned on, Vout1>Vout2 at the time t2. Consequently, when the p-MOS switch 2 is on-state, the current supply destination is the output capacitor Cout2. Even when the p-MOS switch 1 is on-state, the actions of the diodes D1 and D2 prevent the current from flowing to the output capacitor Cout1. The current flow to the output capacitor Cout2 increases the output voltage Vout2. The inductor current IL and the current Ip2 of the p-MOS switch decrease, and reach 0 [A] at the time t3.

The output signal of the oscillator 32 rises at the time t4 and, at the same time, the control signal Sn becomes the high level. The n-MOS switch 11 is turned on, and the inductor current IL starts to increase. At this time, both the comparators CMP1 and CMP2 output the high level signals. As a result, (S1, S2)=(Low, High). At the time t5, the control signal Sn falls, and the n-MOS switch 11 is turned off. At this time, as with the cases at the times t2 to t4, the current supply destination becomes the output capacitor Cout2. Consequently, the output voltage Vout2 rises. At the time t6, the output voltage Vout2 exceeds VREF2. The inductor current IL and the current Ip2 decrease, and reaches 0 [A] at the time t7.

At the time t8, the control signal Sn becomes the high level. At this time, the comparator CMP1 outputs the high level signal, and the comparator CMP2 outputs the low level signal (because Vout2 becomes at least VREF2). As a result, (S1, S2)=(High, Low). At the time t9, the control signal Sn falls, and the n-MOS switch 11 is turned off. The current supply destination becomes the output capacitor Cout1. Consequently, the output voltage Vout1 increases. At the time t10, the output voltage Vout1 exceeds VREF1. The inductor current IL and the current and the current Ip1 of the p-MOS switch decrease, and reach 0 [A] at the time t11.

At the time t12, the output signals of the comparators CMP1 and CMP2 are switched to the low level signals and the signals become such that (S1, S2)=(Low, Low) accordingly. After this time, the control signal Sn becomes the low level until the voltage becomes again such that Vout1<VREF1 or Vout2<VREF2, and switching is stopped.

In the third embodiment, when the output voltage used as the power source of the control circuit (more specifically, the power source of the control signal generator) decreases, power is supplied to this output system with precedence over the other output systems. Consequently, even if the voltage of the output system decreases, the voltage can be recovered quickly. Consequently, stop of the operation of the control circuit due to reduction in voltage can be prevented. The stability of the circuit therefore increases.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A DC-DC converter, comprising: an inductor configured to be supplied with an input voltage;
a plurality of rectifiers connected in parallel to the inductor;
a plurality of p-MOS transistors connected in series to respective rectifiers of the plurality of rectifiers;
a switch configured to connect an output side of the inductor to a reference potential; and
a control circuit configured to control the p-MOS transistors and the switch,
wherein the control circuit comprises: a plurality of buffer circuits corresponding to the respective p-MOS transistors; and a control signal generator, and
each of the buffer circuits is connected to output terminals of all the p-MOS transistors other than the p-MOS transistor corresponding to each of the buffer circuits,
the control signal generator outputs a first control signal to the first buffer circuit corresponding to a first p-MOS transistor selected from among the p-MOS transistors, the first control signal instructing to output a first predetermined voltage to turn on the first p-MOS transistor to the first p-MOS transistor, and
the control signal generator outputs a second control signal to the second buffer circuit corresponding to a second p-MOS transistor other than the first p-MOS transistor among the p-MOS transistors, the second control signal instructing to output a second voltage depending on an output voltage of the first p-MOS transistor to the second p-MOS transistor, the first buffer circuit supplies the first predetermined voltage to a gate terminal of the first p-MOS transistor according to the first control signal, and the second buffer circuit supplies the second voltage depending on the output voltage of the first p-MOS transistor to a gate terminal of the second p-MOS transistor according to the second control signal.

2. The DC-DC converter according to claim 1, wherein the control circuit compares output voltages of the p-MOS transistors with a plurality of reference voltages corresponding to the respective p-MOS transistors, and selects the first p-MOS transistor according to differences from the reference voltages.

3. The DC-DC converter according to claim 2, wherein the control circuit is driven using an output voltage of one p-MOS transistor among the p-MOS transistors.

4. The DC-DC converter according to claim 3, wherein the one p-MOS transistor is the p-MOS transistor corresponding to a lowest reference voltage among the reference voltages.

5. The DC-DC converter according to claim 2, wherein the first p-MOS transistor is the p-MOS transistor having a largest difference among differences between the output voltages and the reference voltages.

6. The DC-DC converter according to claim 3, wherein the output voltage of the one p-MOS transistor is compared with the reference voltage corresponding to the one p-MOS transistor, and when the output voltage of the one p-Mos transistor is lower than the reference voltage of the one p-Mos transistor, the one p-MOS transistor is selected and the one p-MOS transistor selected is the first p-MOS transistor.

7. The DC-DC converter according to claim 1, wherein a number of parallel connections of the rectifiers is two.

8. The DC-DC converter according to claim 1, further comprising a plurality of capacitors connected between the reference potential and output sides of the p-MOS transistors.

9. The DC-DC converter according to claim 1, further comprising: an input terminal configured to receive the input voltage; and a plurality of output terminals configured to output voltages of the p-MOS transistors.

10. A power source device, comprising:

a voltage source configured to generate a voltage; and the DC-DC converter according to claim 1, wherein the voltage generated by the voltage source is supplied to the inductor of the DC-DC converter.

* * * * *